United States Patent
Mahdavi

(10) Patent No.: US 7,536,474 B2
(45) Date of Patent: May 19, 2009

(54) METHODS AND SYSTEMS TO FAST FILL MEDIA PLAYERS

(75) Inventor: Jamshid Mahdavi, San Jose, CA (US)

(73) Assignee: Novell, Inc., Provo, UT (US)

( * ) Notice: Subject to any disclaimer, the term of this patent is extended or adjusted under 35 U.S.C. 154(b) by 520 days.

(21) Appl. No.: 10/884,488

(22) Filed: Jul. 2, 2004

(65) Prior Publication Data

US 2004/0234253 A1 Nov. 25, 2004

Related U.S. Application Data

(62) Division of application No. 10/037,119, filed on Oct. 25, 2001, now Pat. No. 6,801,964.

(51) Int. Cl.
*G06F 15/16* (2006.01)
*H04N 7/173* (2006.01)

(52) U.S. Cl. .................. 709/234; 709/231; 725/90; 725/94

(58) Field of Classification Search ............... 709/231, 709/203; 725/90, 94, 95, 98
See application file for complete search history.

(56) References Cited

U.S. PATENT DOCUMENTS

| | | | | |
|---|---|---|---|---|
| 5,935,206 A * | 8/1999 | Dixon et al. | ................ | 709/219 |
| 6,009,482 A | 12/1999 | Robertson | ..................... | 710/35 |
| 6,122,708 A | 9/2000 | Faraboschi et al. | ........... | 711/118 |
| 6,161,142 A | 12/2000 | Wolfe et al. | ................. | 709/230 |
| 6,208,619 B1 | 3/2001 | Takeuchi | | |
| 6,263,371 B1 | 7/2001 | Geagan, III et al. | ......... | 709/231 |
| 6,275,471 B1 | 8/2001 | Bushmitch et al. | .......... | 370/248 |
| 6,292,834 B1 | 9/2001 | Ravi et al. | | |
| 6,301,258 B1 | 10/2001 | Katseff et al. | ............... | 370/412 |
| 6,363,413 B2 * | 3/2002 | Kidder | ....................... | 709/203 |
| 6,405,256 B1 * | 6/2002 | Lin et al. | .................... | 709/231 |
| 6,490,705 B1 * | 12/2002 | Boyce | ........................ | 714/776 |
| 6,611,519 B1 * | 8/2003 | Howe | ......................... | 370/386 |
| 6,665,728 B1 | 12/2003 | Graumann et al. | ......... | 709/232 |
| 6,665,751 B1 | 12/2003 | Chen et al. | .................... | 710/52 |
| 6,683,889 B1 | 1/2004 | Shaffer et al. | ............... | 370/516 |
| 6,697,356 B1 | 2/2004 | Kretschmer et al. | ......... | 370/352 |
| 6,708,213 B1 | 3/2004 | Bommaiah et al. | .......... | 709/226 |
| 6,754,715 B1 * | 6/2004 | Cannon et al. | .............. | 709/231 |
| 6,772,217 B1 * | 8/2004 | Baumann et al. | ............ | 709/232 |
| 6,792,449 B2 * | 9/2004 | Colville et al. | .............. | 709/215 |

(Continued)

OTHER PUBLICATIONS

V. Jacobson; "Congestion avoidance and control", ACM SIGCOMM Computer Communication Review, vol. 18, Aug. 1988.*

(Continued)

*Primary Examiner*—Patrice Winder
*Assistant Examiner*—Lin Liu
(74) *Attorney, Agent, or Firm*—Schwegman, Lundberg & Woessner, P.A.

(57) ABSTRACT

Methods and systems are provided to fast fill media players and buffers associated with media players. A bandwidth associated with initial startup of a media player is overloaded to rapidly fill the buffer and initiate the media player. Alternatively, multiple simultaneous data communication sessions are established with a media data source device, and the media data are concurrently received from the simultaneous sessions into the buffer or transferred of out the buffer at startup, thereby decreasing the latency associated with initiating the media player.

4 Claims, 6 Drawing Sheets

U.S. PATENT DOCUMENTS

| | | | |
|---|---|---|---|
| 6,813,580 B2 | 11/2004 | Florschuetz | |
| 7,111,058 B1 | 9/2006 | Nguyen et al. | |
| 7,117,521 B2 | 10/2006 | Puthiyedath | |
| 2002/0112244 A1* | 8/2002 | Liou et al. | 725/93 |
| 2003/0033425 A1 | 2/2003 | Deshpande | |
| 2003/0040917 A1* | 2/2003 | Fiedler | 704/500 |
| 2003/0067872 A1* | 4/2003 | Harrell et al. | 370/229 |
| 2004/0240842 A1 | 12/2004 | Mahdavi | |

OTHER PUBLICATIONS

Markus Hofmann et al., "Caching techniques for Streaming Multimedia over the Internet", Bell Labs Technical Memorandum, Apr. 1999.*

Joanna, Kulik, "A Simulation Study of Paced TCP", *BBN Technical Memorandum No. 1218,*, (Sep. 16, 1999).

Rao, A., et al., "Real Time Streaming Protocol (RTSP)", *FRC 2326 abstract*, (Apr. 1998).

"U.S. Appl. No. 10/884,494, Response filed Oct. 21, 2007 to Final Office Action mailed Sep. 4, 2007", 7 pgs.

"Final Office Action mailed Sep. 4, 2007 in U.S. Appl. No. 10/884,494", 17 pgs.

"U.S. Appl. No. 10/037,119 Notice of Allowance mailed Jun. 15, 2004", 9 pgs.

"U.S. Appl. No. 10/884,494, Non Final Office Action mailed Mar. 21, 2007", 13 pgs.

"U.S. Appl. No. 10/884,494, Preliminary Amendment filed Jul. 2, 2004", 7 pgs.

"U.S. Appl. No. 10/884,494, Response filed Jun. 25, 2007 to Non Final Office Action mailed Mar. 21, 2007", 10 pgs.

"U.S. Appl. No. 10/884,494 Non-Final Office Action mailed Dec. 20, 2007", 16 Pages.

" U.S. Appl. No. 10/884,488 Response filed Mar. 19, 2008 to Non-Final Office Action mailed Dec. 20, 2007", 10 pgs.

"U.S. Appl. No. 10/884,488, Non Final Office Action mailed Mar. 9, 2007", 13 pgs.

"U.S. Appl. No. 10/884,488, Preliminary Amendment filed Jul. 2, 2004", 7 pgs.

"U.S. Appl. No. 10/884,488, Response filed Jun. 11, 2007 to Non Final Office Action mailed Mar. 9, 2007", 9 pgs.

"U.S. Appl. No. 10/884,488 Non-Final Office Action mailed Dec. 20, 2007", 15 Pages.

* cited by examiner

METHODS AND SYSTEMS TO FAST FILL MEDIA PLAYERS

PRIORITY

The present application is commonly assigned to, with, a divisional of, and claims priority to U.S. Ser. No. 10/037,119, entitled "Methods and Systems to Fast Fill Media Players," filed on Oct. 25, 2001, now issued as U.S. Pat. No. 6,801,964; the disclosure of which is incorporated by reference herein.

COPYRIGHT NOTICE/PERMISSION

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever. The following notice applies to the software and data as described below and in any drawings hereto: Copyright © 2001, Volera, Inc., All Rights Reserved.

FIELD OF THE INVENTION

The present invention relates to fast filling media players, and in particular to methods and systems used to fast fill media buffers used by media players upon initial startup of the media player, thereby reducing latency associated with initial media player startup during a streaming data session.

BACKGROUND OF THE INVENTION

A wide variety of off-the-shelf media players are available in the industry to play media data, such as video or audio data. Because the byte size associated with media data is typically very large, delivering media data to a media player can be technologically challenging. This challenge is especially problematic when a media player resides on a computing device that receives media data from a media source device via a connection with only limited bandwidth capabilities.

To solve the media data delivery problem, a number of solutions have been developed. First, increased bandwidth connections to media source devices have become readily available to end-users. Some of these increased bandwidth connections include cable connections, Digital Subscriber Line (DSL) connections, satellite connections, and the like. Furthermore, end-users, in some cases, have elected to completely download media data to their local computing devices before playing the media data on the media player. Moreover, the industry has developed data streaming techniques, streaming communication protocols, and caching techniques to reduce latency or perceived latency associated with delivering media data to media players.

Generally, existing data streaming techniques intentionally introduce latency in order to buffer the media data. This allows the data to be processed more uniformly, thereby permitting the media player to continuously play a stream of media data. As the media player consumes media data, additional media data are received, thereby keeping the media player's buffer full. In this way, the media data appear to play uninterrupted to an end-user viewing or listening to the media data within the media player's viewer. Accordingly, initial latency is believed to be necessary to improve the end-user's overall experience so that, once play is initiated, it is not choppy (e.g., interrupted).

Yet, latency associated with initially starting the media player is annoying to end-users and often the end-users attribute poor service to the initial startup delays. Existing media players do not start playing the media data until enough media data are received into the media player's buffer to support the data streaming process. As a result, the end-user experiences an intentional and often frustrating latency until the media player's buffer acquires enough media data from the media source device to begin playing.

Generally, streaming content requires startup delays, when played on media players, for periods of five seconds or more as the media player's buffer is populated with media data. Moreover, the streaming content is delivered to the media player at a fixed rate using a fixed bandwidth. Correspondingly, the streaming content cannot avoid startup delays with present methods and systems.

As is apparent, there exists a need for improving the delivery of streaming content to existing media players, wherein an initial latency can be eliminated or substantially diminished. In this way, end-users will experience immediate service from a streaming content provider. Moreover, there exist a need for the end-user to not have to modify existing media players to reduce startup latency. Further, there exists a need for the end-user to be able to maintain the end-user's existing bandwidth connections and still enjoy a latency-free media player.

SUMMARY OF THE INVENTION

In one embodiment of the present invention, a method to fast fill a media player is provided, wherein a latency associated with a startup time of a media player required to initially play media data is identified. Furthermore, a bandwidth of the media player associated with receiving the media data in a buffer of the media player is identified. Additionally, the bandwidth is increased by a factor resulting in the media data filling the buffer before the startup time thereby decreasing the latency.

In another embodiment of the present invention, a method of customizing an increased bandwidth associated with fast filling a media buffer is provided. A player bandwidth associated with a media player and a stream bandwidth associated with streaming media data over a media transport to the media player are identified. Moreover, a transfer bandwidth of the media data is established to initially fill the media buffer of the media player over the media transport by selecting the transfer bandwidth to be the player bandwidth increased by a multiplier determined by dividing the stream bandwidth by the player bandwidth.

In still another embodiment of the present invention, a method of fast filling a media player is provided, wherein a plurality of data communication requests to a media source is used. Furthermore, a plurality of media data transfer sessions associated with each communication request is established with the media source. Also, portions of media data are simultaneously received during each of the transfer sessions into a buffer associated with the media player and residing on a client. Finally, when the buffer is filled the media player is initiated.

In yet another embodiment of the present invention, a media data system to provide media data to a media player is provided. The media data system includes a buffer associated with a media player and media data received from a cache into the buffer. The media player uses the media data, when a minimum size of the media data is acquired at a startup prior to the media data being used by the media player. The cache acquires the minimum size of the media data prior to a request by the media player for the media data and delivers the minimum size of the media data on the request by the media player by transferring the media data into or out of the buffer at a rate in excess of a bandwidth rate associated with the media player.

In still another embodiment of the present invention, a system for fast filling media data into a media player's buffer at startup is provided. The system includes a media player, a media buffer used by the media player to play media data, and a data transfer controller. The controller acquires the media data from a media source data storage and overloads the media buffer at a startup to reduce latency associated with the startup of the media player.

Still other aspects of the present invention will become apparent to those skilled in the art from the following description of various embodiments. As will be realized the invention is capable of other embodiments, all without departing from the present invention. Accordingly, the drawings and descriptions are illustrative in nature and not intended to be restrictive.

DETAILED DESCRIPTION OF THE INVENTION

Figure 1:
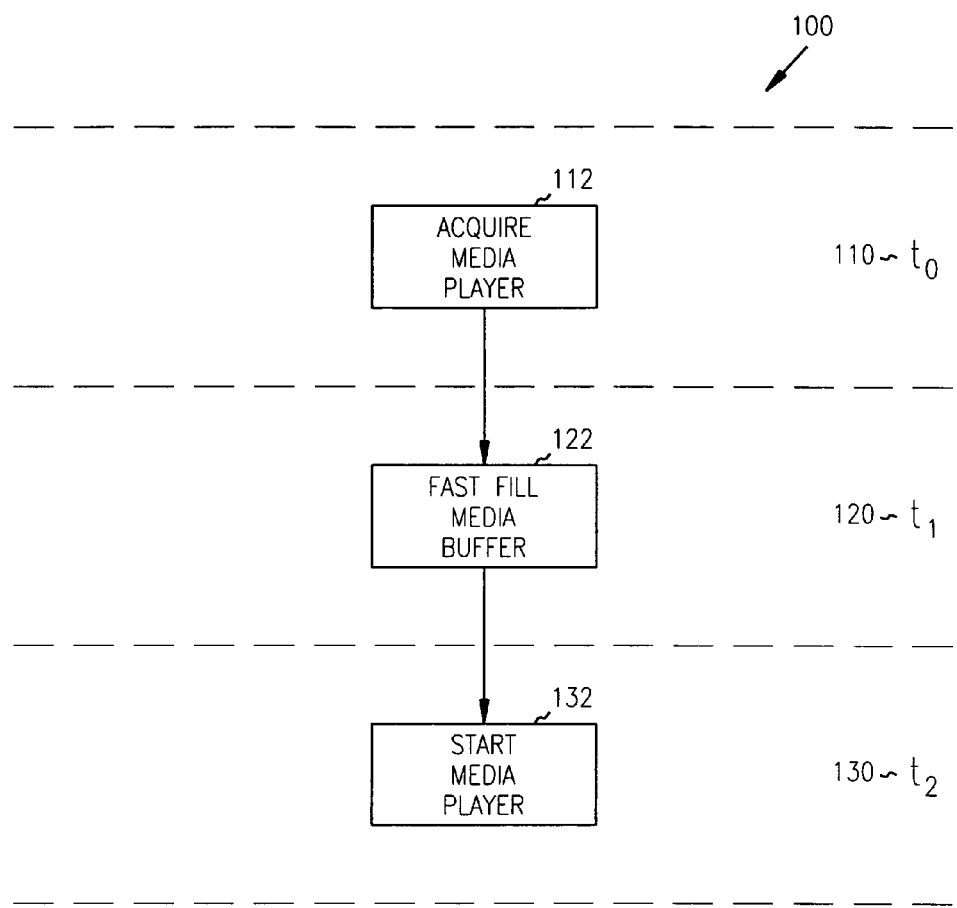
FIG. 1 is a flowchart representing a method of fast filling a media player.

In the following description, reference is made to the accompanying drawings that form a part hereof, and in which is shown by way of illustration specific embodiments in which the invention may be practiced. These embodiments are described in sufficient detail to enable those skilled in the art to practice the invention, and it is to be understood that other embodiments may be utilized and that structural, logical, optical, and electrical changes may be made without departing from the scope of the present invention. The following description is, therefore, not to be taken in a limited sense, and the scope of the present invention is defined by the appended claims.

Software for the system is stored on one or more computer readable media. In one embodiment the software is stored on secondary storage, such as a disk drive, and loaded into main memory and cache of the computer as needed. The software is written in the form of executable instructions that generally provide a single function or subsets of related functions. However, in various embodiments, the software comprises a single module or many modules, and there is no requirement that functions be grouped together. Hardware and/or firmware are used to implement the invention in further embodiments. The software may implement the functions, or simply facilitate the performance of the function by a human by providing menu driven interfaces, or other means of providing information to the system for database storage.

As used herein, "media player" refers to any existing software, or sets of executable instructions, operable to visibly and/or audibly communicate media data to an end-user via a visual/audio output device. Media data includes, by way of example only, video data, audio data, graphical data, text data, image data, and the like. Further, it is readily appreciated by those skilled in the art that a single media player can simultaneously present all forms of media data on a visual/audio output device. Also the term "buffer," as used herein, refers to storage or memory (e.g., volatile or non-volatile memory) which houses media data for the consumption of the media player. In some embodiments, the buffer is an integral component of the media player, and in other embodiments the buffer is independent of the media player.

Moreover, as used herein "bandwidth" refers to the capacity of data transfer associated with two computing devices or software applications communicating with one another by transferring data between one another. In some embodiments, bandwidth is restricted by software limitations and in other embodiments bandwidth is restricted by hardware limitations. Further, bandwidth in some embodiments is associated with hardwired data communication connections, and in other embodiments bandwidth is associated with wireless, radio frequency, satellite, or infrared data communication connections.

Furthermore, in one embodiment the present invention is implemented in the C++ programming language within Netware's operating system environment distributed by Novell, Inc. of Provo, Utah using a Proxy Cache distributed by Volera, Inc. of San Jose, Calif., wherein the media player is Apple's QuickTime media player. Of course any programming language, operating system, hardware platform, cache or non-cache system, or media player now known or hereafter developed, can be used without departing from the tenets of the present invention.

FIG. 1 shows one flowchart representing one method 100 for fast filling a media player according to the present invention. Initially, a client-computing device having a media player executing thereon requests media data. The media data are acquired in step 112 at time $t_0$ 110. The media data, in some embodiments, reside on a media content server, mass storage device, or with a media content service. In other embodiments, frequently accessed media data reside on a cache either remote from the server/client-computing device or within the server/client-computing device.

In order for the media data to be acquired by the media player, the data must be transferred or streamed from the media data's present location (e.g., original source location, temporary cache location, and the like) to a media player's buffer residing on the client-computing device with the media player. As previously presented the buffer, in some embodiments, is an integral part of the media player, and in other embodiments the buffer is separate and independently accessible separate and apart from the media player.

To stream or acquire the media data from the media data's present location to the media player, a data communication must be established between the media player/computing device and a transferring set of executable instructions residing at the media data's present location. The media data transfer rate occurring during the communication process is circumscribed by the bandwidth associated with the media player/computing device and the transferring set of executable instructions. Further in some embodiments, the data communication protocol used is Transmission Communication Protocol (TCP), User Datagram Protocol (UDP), Real-time Streaming Protocol (RTSP), Internet Streaming Media Protocol, and others.

In step 122, the media buffer is fast filled at a startup time $t_1$ 120. It is at time $t_1$ 120 that the media data is streamed into the media buffer to fill the buffer. Existing techniques used to fill the media buffer result in a latency upon media player startup, before the media data begins to play on the media player. This is so, because existing techniques do not alter the bandwidth associated with the data communication, or otherwise attempt to burst a large amount of initial media data into the buffer to fill it in a short period of time, such that latency is avoided at startup or significantly and substantially reduced.

In some embodiments of the present invention, a bandwidth of the media player/client-computing device is altered at time $t_1$ 120 to be substantially increased by a multiplier/factor for a very short duration, or until the buffer is rapidly filled with media data. In other embodiments, this increased bandwidth is readily achieved since the media data's present location resides on a cache in direct high-speed communication with the client-computing device, and correspondingly the increased bandwidth occurs without any hardware limitations. In other embodiments, existing server applications allow a quick and sudden burst of media data to be transferred to the media buffer, beyond the bandwidth generally used for such a data transfer.

In still other embodiments, the bandwidth can appear to have been substantially increased resulting in no latency or substantially reduced latency by establishing a plurality of independent data communication sessions with the device housing the media data, wherein each session requests a different portion of the media data and each session delivers the media data concurrently to the media buffer. In this way, the media buffer is rapidly filled at time $t_1$ 120 using multiple parallel connections to the media data's source location, and the bandwidth associated with the media player appears to have been substantially increased improving throughput of operation of the media player.

In still other embodiments, the media player is tricked into believing the media buffer is full and contains the appropriate sequential media data packets by acquiring initial media data packets and replicating them or otherwise acquiring data packets out of sequence and stuffing the buffer. The media player will inspect the packet before playing the packet, and by the time a packet, which has already played or is otherwise out of sequence within the buffer, is obtained by the media player, the correct next sequential data packet will be in the buffer for media player consumption.

In other embodiments, media data packets are stuffed into the beginning and the very end of the buffer but not the middle of the buffer, again tricking the media player into believing the buffer is filled. In this way, the media player believes the buffer is full, but the sequence of the media data packets is out of order or the middle of the buffer is empty, and when the media data reaches a point where an error could arise, the correct data has been obtained and properly inserted into the buffer.

However, sending data at an excessive bandwidth can cause data congestion for the media player and/or data communication protocol. Correspondingly, in some embodiments the pacing algorithm used by the media players is modified to handle the increased bandwidth. This is particularly beneficial when TCP is being used as the communication protocol, since TCP automatically manages and handles congestion avoidance. In other embodiments, the increase in bandwidth is customized to ensure the media player and/or data communication protocol is capable of handling the increased data burst at time $t_1$ 120.

Once the media buffer is fast filled with media data in step 122 at time $t_1$ 120, the media player is started, or begins to play the media data at time $t_2$ 130. As one skilled in the art will readily recognize, the difference between time t2 130 and time t1 120 is minimal, in fact to an end-user this difference in some embodiments is undetectable. Accordingly, an initial latency associated with starting or initiating a media player is eliminated or substantially reduced with the tenets of the present invention, by fast-filling the media buffer of the media player at startup.

As is readily apparent to those skilled in the art, the media data which are delivered to the media player via the media buffer, need not be delivered at the beginning of the media data. For example in some embodiments, a video associated with the media data is sent to the media player from a location within the middle of the video and not at the start of the video. There is no requirement that an entire video, or the start of the video be the media data being streamed to the media player for purposes of the present invention.

Figure 2:
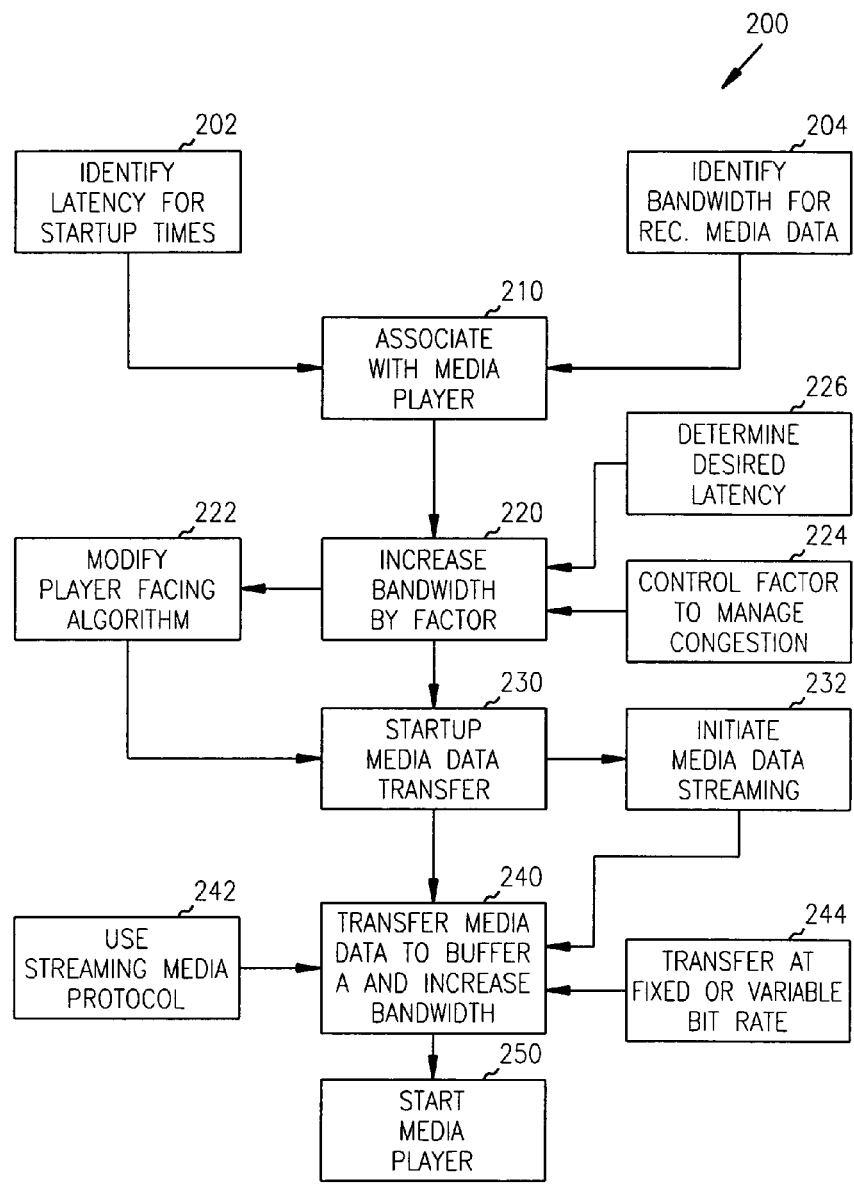
FIG. 2 is a flowchart representing another method of fast filling a media player.

FIG. 2 shows a flowchart representing another method 200 of fast filling a media player. Initially in steps 202 and 204, latency associated with a startup of a media player/stream and a bandwidth associated with receiving media data into the media player's buffer are identified, respectively. The execution order of steps 202 and 204 are not critical, in fact each step is performed in parallel in some embodiments. Also, identifying the latency associated with a startup of a media player is readily observable during normal operation of the media player, and in other embodiments is automatically trapped or recorded using a set of executable instructions monitoring the elapsed time associated with a media player request to play and the actual initiation of play. Further, as is appreciated in some embodiments latency is a result of the configuration of the media player.

Further, in some embodiments, the bandwidth associated with a media player's connection is provided by the media player itself, while in other embodiments the bandwidth is manually or automatically detectable during a transfer of media data from a media data source device housing the media data to the media player's computing device. Moreover as will be apparent to those skilled in the art, the bandwidth associated with one media source device and media player interaction can vary with a different media source device and media player interaction.

In step 210, the bandwidth identified with the media player and/or media source device is associated with the media player. Next, the identified bandwidth is increased by a factor, in step 220, before a startup time associated with executing the media player and the media data is filled into the media player's buffer. Thus, latency associated with the startup time of the media player is eliminated or substantially and significantly decreased. As one skilled in the art will appreciate, this gives an end-user the illusion that the media player begins play almost immediately with no latency and thereby improves the end-user's overall expectations and impressions of the media player and/or the streaming content service provider.

Furthermore as presented above, the factor increase in bandwidth is achieved through a variety of techniques or combinations of techniques. For example, assuming the media player's computing device includes a higher bandwidth than the pacing algorithm associated with the media player, then the pacing set of executable instructions which implements the pacing algorithm on the media player's computing device, server computing device, cache computing device, or any other computing device transferring the media data, is modified to provide the factor increase desired, as depicted in step 222.

Moreover, the factor increased can be controlled or otherwise managed, in step 224, to avoid data congestion during the initial media data transfer from the media source device to the media player's buffer, as depicted in step 224. This control, in some embodiments, is achieved by determining the desired initial minimum latency required by the media player or data communication protocol (e.g., UDP and others), as depicted in step 226. Next, the factor is readily resolved by dividing the minimum initial latency time represented in seconds or milliseconds by the media player's identified latency in like time units.

With the increased bandwidth or perceived increased bandwidth, a media data transfer session transferring the media data residing on a media data source device (e.g., cache of the media player computing device, cache of a remote server servicing the media player and interfacing with the media data source device, remote media data content service provider, and the like) to the media player is started in step 230. And, in step 232 the media data streaming is initiated.

Accordingly in step 240, the media data are transferred at an increased or perceived increased bandwidth. Previously presented media data, in some embodiments, are delivered using a streaming media protocol as depicted in step 242. In other embodiments, the media data are delivered in a fixed bit rate transmission or in a variable bit rate transmission, as depicted in step 244.

Finally, in step 250 the media player is started and begins to play at least a portion of the streamed media data almost immediately, since the latency associated with filling the media buffer has been significantly reduced or eliminated altogether.

Figure 3:
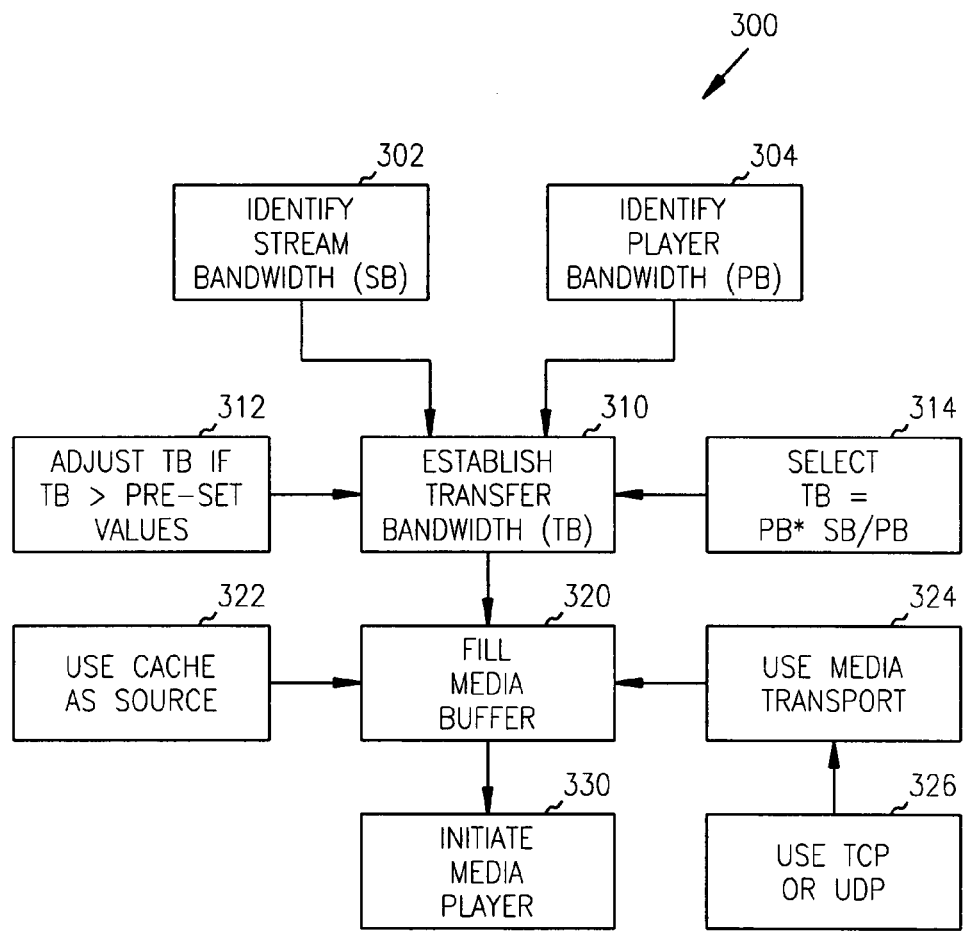
FIG. 3 is a flowchart representing a method of fast filling a media buffer.

FIG. 3 shows one flowchart representing one method 300 for fast filling a media buffer. In step 302, a stream bandwidth is identified, wherein the stream bandwidth is associated with delivery of the media data from its present location to the media buffer, which is used by the media player to play the media data. Again the media data, in some embodiments, reside in a local cache (e.g., step 322) to the computing device of the media player, or in a remote cache (e.g., step 322) that is in close and high speed communication with the media player such as, and by way of example only, an Internet Service Provider computing device servicing the media player, a Cable or DSL computing device servicing the media player, a server computing device servicing a network, and the like. In other embodiments, the media data's present location is at a media data content provider's computing device or mass storage device location.

In step 304, the media player's bandwidth is identified. Identification of the media player's bandwidth is readily achieved with any of the above, previously presented, methods and techniques. Further, a transfer bandwidth is established in step 310. The transfer bandwidth is the rate at which the media data will initially burst from the media data's present location to fast fill the media buffer (e.g., step 320) at a startup time associated with the media player. The media data are provided to the media buffer over a media transport in step 324. The media data transport includes, by way of example only, an Internet transport, a hardwired transport, a wireless transport, a radio frequency transport, an infrared transport, and the like. Further in some embodiments, the media transport uses TCP, UDP, or other data communication protocols now know or hereafter developed (e.g., step 326).

The transfer bandwidth is established in step 310, in some embodiments, by increasing the identified player bandwidth by a multiplier determined by dividing the stream bandwidth by the player bandwidth as depicted in step 314. Further, in order to account for minimum latency to avoid media player or media transport congestion, a minimum transfer bandwidth, in some embodiments, overrides any established transfer bandwidth, when the transfer bandwidth exceeds a pre-set value associated with the minimum transfer bandwidth, as depicted in step 312. In this way, the transfer bandwidth is customizable/configurable to alleviate congestion problems associated with streaming the media data from the media data's present location to the media player's buffer.

Figure 4:
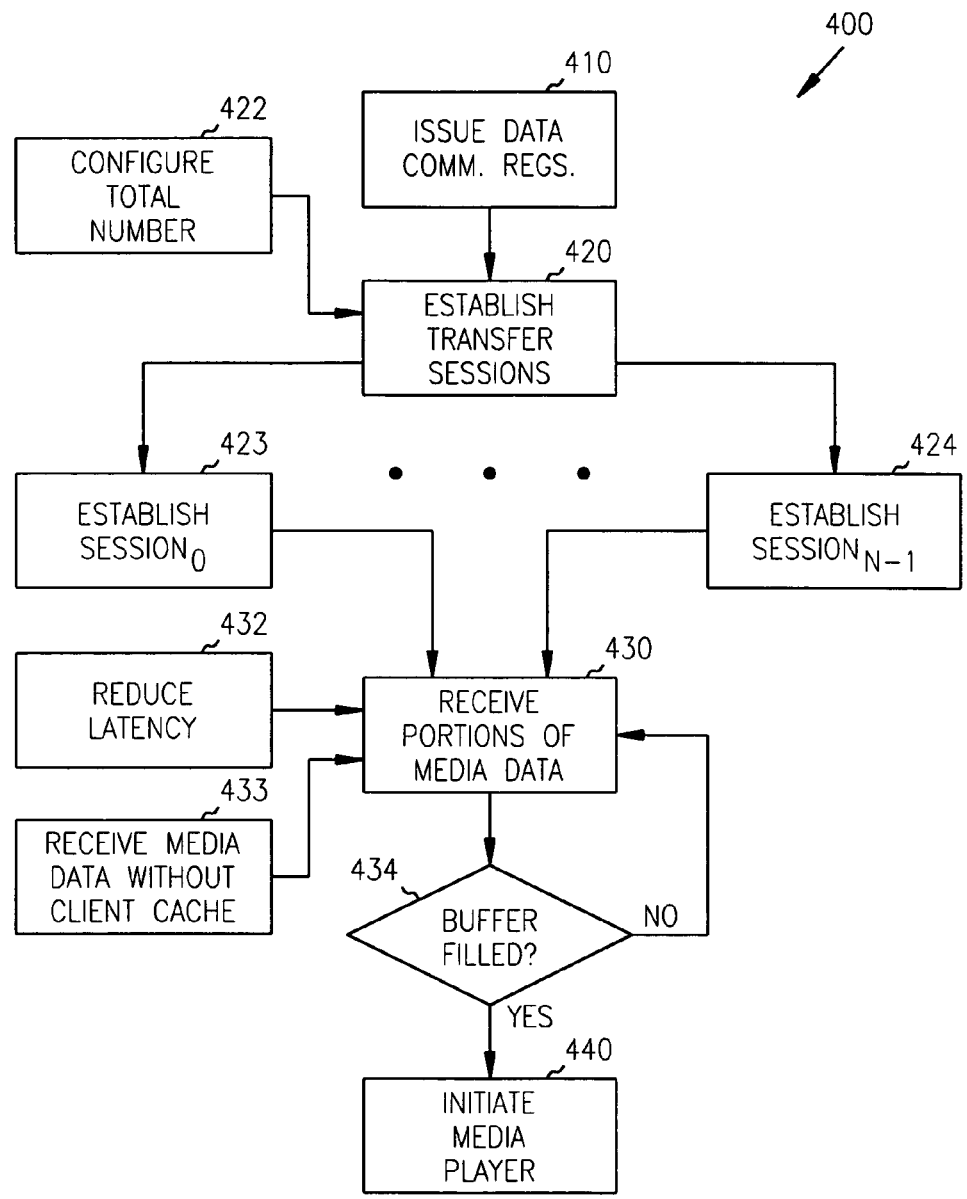
FIG. 4 is a flowchart representing another method of fast filling a media player.

FIG. 4 shows one flowchart representing another method 400 for fast filling a media player. Initially, a media player bandwidth and a bandwidth associated with transferring media data to the media player is identified. Next a desired latency associated with initiating the media player is determined. As one skilled in the art will readily appreciate, once this information is acquired a determination is made as to how many independent data communication requests to a media source are required to achieve the desired latency.

Accordingly, in step 410 a plurality of data communication requests are used or otherwise issued to the media source. Each data communication request establishes a media data transfer session in step 420 with the media source. The total number of sessions is configurable as depicted in step 422 based on the desired latency, if any.

Next, each session (e.g., 423 through 424) is concurrently executed or executed in parallel, resulting in different portions of the desired media data being simultaneously received into the media buffer. As one skilled in the art will appreciate, these concurrent media data transfers reduce latency associated with filling the media player's buffer and consequently media player initiation, as depicted in step 432. In some embodiments, the media player and the media buffer reside on a client-computing device. In other embodiments, the media data reside and are being transferred from a computing device directly to the media player's buffer without using any cache memory or cache storage, as depicted in step 433.

The simultaneously received portions of media data are depicted in step 430, where in step 434 the buffer is checked to determine if the buffer is full. If the buffer is not full, the simultaneous sessions are initiated again. Otherwise, the media player is initiated with the full media player buffer in step 440.

Figure 5:
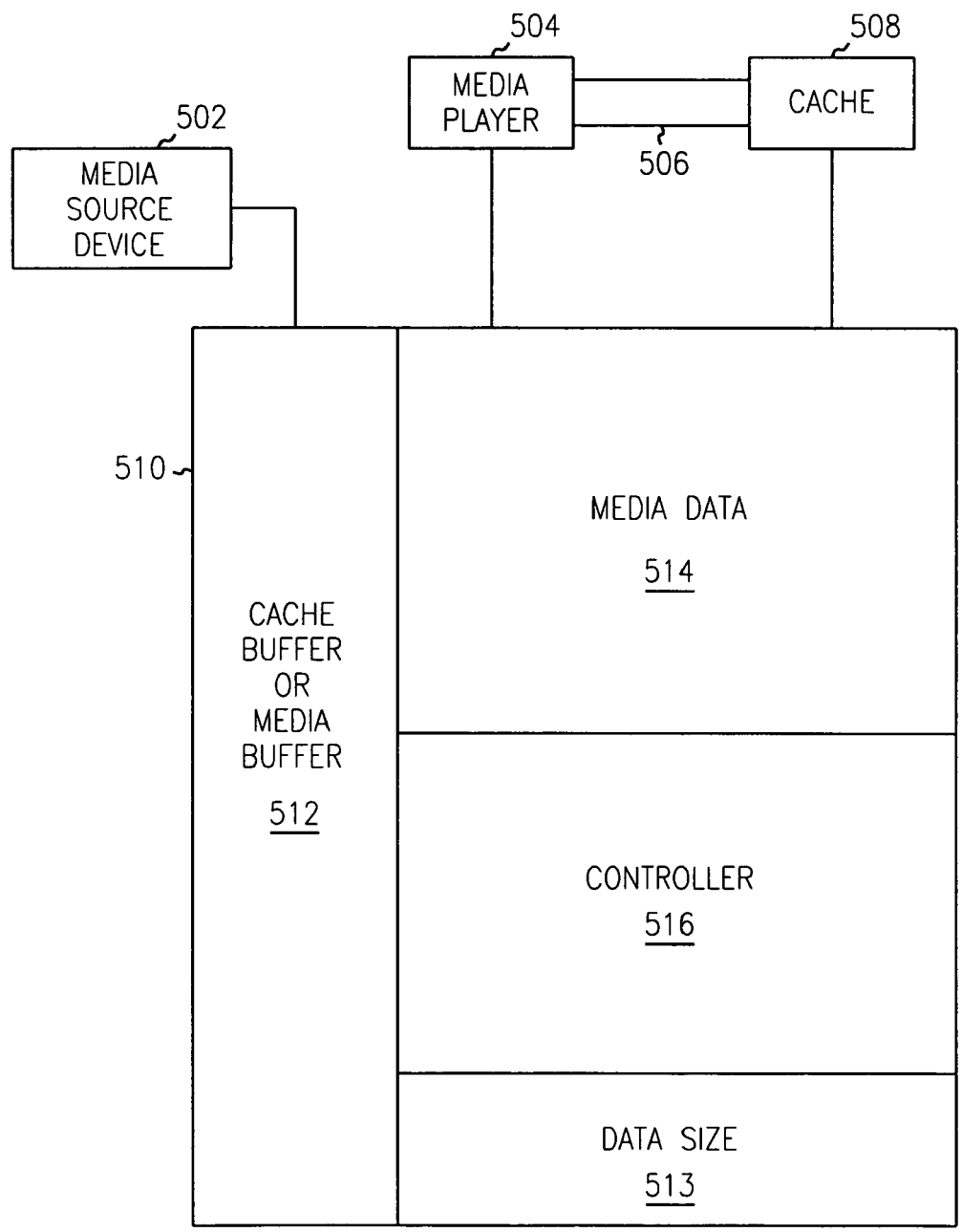
FIG. 5 is a block diagram of a media data system.

FIG. 5 shows one media data system 510 according to the teachings of the present invention. The system 510 includes a cache or media buffer 512 associated with a media player 504 and having a data size 513. The system 510 further includes media data 514, wherein the media data are acquired or streamed from a media source device 502 into a cache 508. Accordingly the media player 504 requires, in some embodiments, the cache or the media buffer 512 having media data 514 of a minimum size 513 at a startup time.

Moreover in some embodiments, the cache 508 acquires the minimum size 513 media data 514 to fill the cache or media buffer 512 prior to a request by the media player 504 for the media data 514. Thus, once the media player 504 makes the request for the media data 514, the cache 508 delivers the full cache buffer or media buffer 512 to the media player 504 for use at a rate in excess of a bandwidth rate normally associated with the media player 504.

In some embodiments, the media data 514 reside in a cache buffer 512 and the media data are transmitted (e.g., out of the cache buffer 512) to the media player 504, and in other embodiments the media player 504 also has a separate media buffer to receive (e.g., into the media player's 504 separate media buffer) the media data 514. In this way in some embodiments, a single buffer exists or in other embodiments multiple buffers exists where one buffer is used to transfer media data 514 from a cache buffer 512 and one buffer receives media data 514 into a media buffer for immediate consumption by the media player 504. Of course in some embodiments the single buffer is a media buffer 512 and no cache buffer is present at all.

Further in still other embodiments, a controller 516 manages media data 514 transfer from the cache 508 to the cache or media buffer 512 and the subsequent consumption of the media data 514 by the media player 502. Moreover in other embodiments, the controller 516 manages media data 514 acquisition from the media source device 502 into or out of the cache 508.

Communication between the media player 504 and the cache 508 occurs, in some embodiments, over communication channel 506. Communication channel 506 includes by way of example only, direct communications with a cache 508 local to the client-computing device housing the media player 504, a remote cache 508 in high speed communication with the client-computing device housing the media player 504, and the like.

In additional embodiments, the cache 508 acquires the media data 514 by directly interfacing through one or more media transport communication channels (not depicted in FIG. 5) with the media source device 502. In other embodiments, the cache 508 is separate from a client-computing device housing the media player 504 and any media buffer 512. Further in still other embodiments, the cache 508 is operable to interface with a plurality of additional cache or media buffers and media players residing on a plurality of additional client-computing devices (not shown in FIG. 5).

Further as is apparent to those skilled in the art, although FIG. 5 depicts system 510 as being contiguous, in some embodiments a media buffer is part of the media player 504. And, in other embodiments a cache buffer 510 is used to interface the media data 514 to a separate media buffer, if present, and the media player 504 directly. Further in still other embodiments, system 510 is physically distributed across one or more storage devices to logically form system 510.

Figure 6:
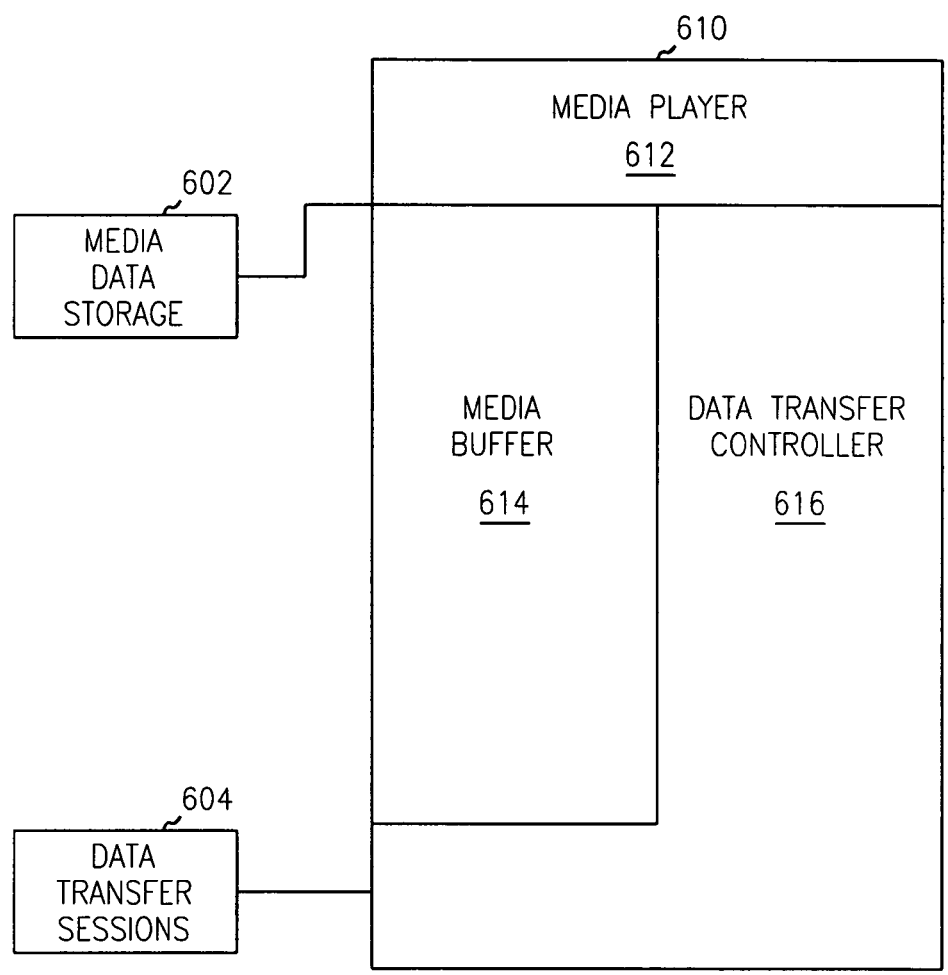
FIG. 6 is a block diagram of a media data system to provide media data to a media player.

FIG. 6 shows one media data system 610 to provide media data to a media player 612. The system 610 includes the media player 612, a media buffer 614 used by the media player 612 to play media data, and a data transfer controller 616. The data transfer controller 616 acquires the media data from a media source data storage 602 and overloads the media buffer 614 at a startup to reduce latency associated with the startup of the media player 612.

In some embodiments the data transfer controller 616 is a set of executable instructions operable to perform a set of logical instructions to reduce latency associated with the startup. In other embodiments, the data transfer controller 616 is one or more electromechanical devices, designed to execute logical instructions to reduce latency associated with the startup. In this way the data transfer controller 616 in some embodiments is embedded within the media player 612, a flash memory device, portable computing device, handheld computing device, and the like.

Furthermore in some embodiments, the media buffer 614 is integrated into the media player 612. Additionally, in some embodiments the rate of data transfer associated with the data transfer controller 616 is configurable. In other embodiments, the data transfer controller 616 overloads the media buffer at the startup by establishing a plurality of data transfer sessions 604 with the media source data storage 602.

The foregoing description of various embodiments of the invention has been presented for purposes of illustration and description. It is not intended to be exhaustive nor to limit the invention to the precise form disclosed. Many alternatives, modifications, and variations will be apparent to those skilled in the art in light of the above teaching. For example, although various embodiments of the invention have been described as a series of sequential steps, the invention is not limited to performing any particular steps in any particular order. Accordingly, this invention is intended to embrace all alternatives, modifications, equivalents, and variations that fall within the spirit and broad scope of the attached claims.

What is claimed is:

1. A computer-implemented media data system to provide media data to a media player, comprising:
   a media buffer implemented in a computer-readable medium;
   a media player implemented in a computer-readable medium and to process on a computer; and
   a data transfer controller, which is implemented in a computer-readable medium and processes on a computer and that acquires the media data from a media source and fills the media buffer at a rate in excess of a player bandwidth associated with the media player, and wherein an expected latency associated with startup of the media player is reduced because of the excess rate, and wherein the media player draws the media data from the media buffer and plays the media data once the media buffer is full, and wherein the rate is achieved by acquiring initial media data packets for the media data and stuffing them into the media buffer as replications within the media buffer to fill the media buffer with replications that are out of sequence and thereby making the media player believe the media buffer is completely full, and wherein as a rest of the media data packets are acquired correction is made within the media buffer before the media player plays the rest of media data packets.

2. The media data system of claim 1, wherein the media buffer is integrated within the environment of the media player.

3. The media data system of claim 1, wherein the media buffer is external to a local environment of the media player.

4. The media data system of claim 1, wherein the media source is at least one of a mass storage device and a cache.

* * * * *